(No Model.)
H. W. FORSLUND.
AUTOMATIC STOP VALVE.
No. 505,514. Patented Sept. 26, 1893.
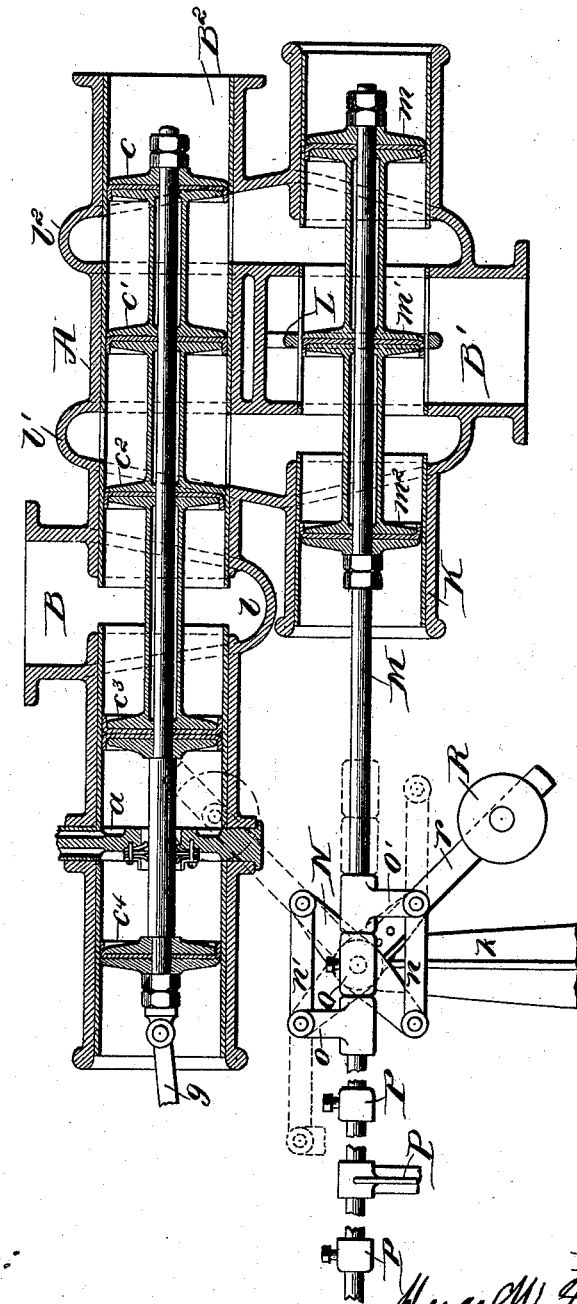

UNITED STATES PATENT OFFICE.

HUGO W. FORSLUND, OF CHICAGO, ILLINOIS, ASSIGNOR, BY DIRECT AND MESNE ASSIGNMENTS, TO THE STANDARD ELEVATOR COMPANY AND WILLIAM H. WELLS, JR., OF SAME PLACE.

AUTOMATIC STOP-VALVE.

SPECIFICATION forming part of Letters Patent No. 505,514, dated September 26, 1893.

Original application filed August 18, 1890, Serial No. 362,364. Divided and this application filed September 16, 1891. Serial No. 405,833. (No model.)

*To all whom it may concern:*

Be it known that I, HUGO W. FORSLUND, a citizen of the United States, residing at Chicago, in the county of Cook and State of Illinois, have invented new and useful Improvements in Automatic Stop-Valves, of which the following is a specification.

This invention relates to hydraulic valves. Its purpose is to provide an improved automatic top and bottom stop or cut off valve for use when the motor is connected with elevators.

The present application is a division and continuation of my application filed August 18, 1890, Serial No. 362,364.

The invention consists in the construction and arrangement substantially as hereinafter described and more particularly set forth in the claims.

The figure of the drawing represents a longitudinal section of a main valve, my automatic stop valve and centering device applied to the same.

The cylinder A carries the main valve, and, as shown, is lined with brass tubing. The passage B is connected with the water service, and the passage B' with the motor; B² is an exhaust passage. The passage B is connected with the cylinder A by means of a hollow belt $b$, encompassing the latter, whereby ample provision is made for the flow of water. A belt $b'$ encompasses the cylinder A and extends downwardly, so as to connect with the passage B', and a third belt $b^2$, similar to the belt $b'$, connects the passage B' with the exhaust passage B².

The valve stem C extends through the center of the cylinder A, and carries five pistons, $c$, $c'$, $c^2$, $c^3$, $c^4$, fitting closely within the cylinder A. The piston $c$ is fixed to the outer end of the stem C, and closes the exhaust passage B². The movement of the valve stem is sufficient to carry this piston across the belt $b^2$, thereby opening connection between the exhaust passage and the motor. The piston $c'$ is fixed upon the stem C in such a position as to play between the belts $b'$ and $b^2$ preventing communication between them through the cylinder A. The piston $c^2$ is fixed upon the valve stem so as to play between the belt $b$ and the side of the belt $b'$. The piston $c^3$ is located upon the side of the passage B opposite from the piston $c^2$. Beyond the piston $c^3$ a rigid diaphragm $a$ is placed across the cylinder A having a stuffing box for the accommodation of the valve stem C. Beyond this diaphragm the piston $c^4$ is fixed upon the stem C. The movement of the valve is secured by hydraulic pressure alternately upon the opposite sides of the diaphragm $a$, acting upon the pistons $c^3$ and $c^4$, and is controlled by a primary or auxiliary valve. A supplementary top and bottom valve is interposed between the main valve and the motor, when the device is applied to an elevator, and consists of the pistons $m$, $m'$ and $m^2$, fixed upon the stem M, and working in a cylinder K. This cylinder is encompassed by the belts $b'$ and $b^2$, and by a belt L connected with the passage B'. The piston $m'$ plays across the belt L so as to close the connection between it and the two belts $b'$ and $b^2$ alternately. The pistons $m$ and $m^2$ are located beyond the belts named, and simply serve to balance the valve. This valve is actuated by means of an arm P, projecting laterally from the piston rod of the motor, (not shown) and sliding upon the valve stem M between the collars $p$ and $p'$, which are rigidly fixed upon the valve stem by set screws, these collars being so located that the arm P comes in contact with them respectively at the extreme of the out and in stroke of the motor. The piston $m'$ is returned to its central position, as shown in Fig. 1, when the arm P is removed from either of the collars $p$ and $p'$, by the return of the stroke of the motor, by means of a weight R, carried upon the main arm, $r$, of a T-crank which is pivoted to a bracket $k$ extending from the motor cylinder, (not shown.) The ends of the cross-arm N of the T-crank are linked to the sliding sleeves $o$ and $o'$, which are carried upon the valve stem M and which when the piston $m'$ is in its central position, abut against the opposite sides of a collar O, fixed upon the valve stem by a set screw. When, by the action of the arm P, the valve stem M is moved in either direction, the weight R is raised as indicated by dotted lines, by the action of the collar O, upon either one of the sleeves o and o'. When this pressure upon the collar is relieved, the valve is returned to its central position, by the descent of the weight R.

The operation of the stop is as follows: In the figure this valve is shown in the position it assumed when the motor is not at either of the limits of its movement. In this position it affects neither the pressure nor the exhaust. Should either the induction or the exhaust ports be allowed to remain open until the motor has reached either of its limits of movement, the piston $m'$ is moved to the right or to the left, as the case may be, by the action of the arm P, shutting off either the induction or the exhaust without regard to the position of the main valve. The automatic action of the stop valve always leaves the main valve free to reverse the motion of the motor.

Having, therefore, described my invention, what I claim as new, and desire to secure by Letters Patent of the United States, is—

1. The combination with a hydraulic motor and its controlling valve a cut-off valve automatically actuated by the motor at each of its limits of movement, and a device for returning said cut-off valve to its center comprising a weighted T-crank pivoted upon a fixed standard, a collar fixed upon the valve stem, a sliding sleeve carried by the valve-stem upon each side of said collar and adapted to abut against it and links uniting each of said sleeves respectively to opposite ends of the cross-arm of the T-crank, substantially as described and for the purpose set forth.

2. As a new article of manufacture a hydraulic motor valve comprising in combination a cylinder having an induction and an eduction port, and two passageways to the motor, a piston valve reciprocating in said cylinder, and having a disk located between the passages to the motor, and disks adapted respectively to close and open communication between the induction and eduction ports, and the adjacent passage to the motor; of an additional cylinder and an automatic cut off valve interposed between the main valve and the motor and communicating with the two passageways from the main valve cylinder and with the passage to the motor, and a piston valve constituting a cut off and having two outer balancing pistons with a stem projecting from such cut off valve; two collars fixed upon said stem and adapted to be engaged by a lateral arm projecting from the piston rod of the motor and sliding between such collars; a weighted T-crank and links connecting the same to sliding sleeves carried upon the stem of the cut off valve and another collar fixed upon such valve stem and co-operating with the sleeves; all substantially as and for the purpose set forth.

In witness whereof I have hereunto set my hand in the presence of two witnesses.

HUGO W. FORSLUND.

In presence of—
AMOOR C. SMITH,
JOHN E. DORMAN.